(12) United States Patent
Cowdery-Corvan

(10) Patent No.: US 9,166,229 B2
(45) Date of Patent: Oct. 20, 2015

(54) METHOD FOR PRODUCTION OF LI2MSIO4 ELECTRODE MATERIALS

(71) Applicant: Cerion Enterprises, LLC, Rochester, NY (US)

(72) Inventor: Peter Jerome Cowdery-Corvan, Webster, NY (US)

(73) Assignee: CERION, LLC., Rochester, NY (US)

( * ) Notice: Subject to any disclaimer, the term of this patent is extended or adjusted under 35 U.S.C. 154(b) by 256 days.

(21) Appl. No.: 13/847,170

(22) Filed: Mar. 19, 2013

(65) Prior Publication Data

US 2013/0243681 A1   Sep. 19, 2013

Related U.S. Application Data

(60) Provisional application No. 61/685,488, filed on Mar. 19, 2012.

(51) Int. Cl.
*C01B 33/32* (2006.01)
*H01M 4/58* (2010.01)
*B82Y 30/00* (2011.01)
*H01M 10/052* (2010.01)

(52) U.S. Cl.
CPC ............ *H01M 4/5825* (2013.01); *B82Y 30/00* (2013.01); *C01B 33/32* (2013.01); *C01P 2004/64* (2013.01); *H01M 10/052* (2013.01); *Y02T 10/7011* (2013.01)

(58) Field of Classification Search
CPC .. H01M 4/5825; H01M 10/052; B82Y 30/00; C01B 33/32; Y02T 10/7011; C01P 2004/64
USPC .................................................. 423/333, 332
See application file for complete search history.

(56) References Cited

U.S. PATENT DOCUMENTS

2011/0269022 A1   11/2011   Kawakami et al.

FOREIGN PATENT DOCUMENTS

WO   WO 2013/005705 A1   1/2013

OTHER PUBLICATIONS

International Search Report and Written Opinion for PCT/US2013/032974, Issued Jul. 8, 2013.
International Written Opinion for PCT/US2013/032974, Issued Oct. 2, 2014.
Database WPI; Week 20094; Thomspn Scientific, London, GB; AN 2009P32259 & CN 101 540 392 A (Univ Xian Architecture) Sep. 23, 2009.
Dominko et al: Journal of Power Sources, vol. 178, No. 2, Mar. 3, 200, pp. 842-847; XP0225837.
V. Aravindan et al., "Influence of Carbon Towards Improved Lithium Storage Properties of $Li_2MnSiO_4$ Cathodes," Journal of Materials, vol. 21, pp. 2470-2475, 2011.
T. Muraliganth et al., "Microwave-Solvothermal Synthesis of Nanostructed $Li_2MSiO_4/C$ (M=Mn and Fe) Cathodes for Lithium-Ion Batteries," Chemistry of Materials, vol. 22, pp. 5754-5761, 2010.

*Primary Examiner* — Colleen Dunn
*Assistant Examiner* — Haytham Soliman
(74) *Attorney, Agent, or Firm* — RatnerPrestia

(57) ABSTRACT

A process for the production of $Li_2MSiO_4$ where M is selected from the group Fe, Mn, Co, and Ni, is disclosed. The process uses an atmospheric-pressure solvothermal synthesis and a calcining step wherein the solvent is selected to be stable from decomposition over the solvothermal process conditions. The solvothermal solvent is recoverable and reusable. The process also relies on an excess of lithium in the starting materials mix to promote phase-purity of the $Li_2MSiO_4$ crystalline phase. The $Li_2MSiO_4$ material is used as a cathode material in a lithium ion battery cell.

7 Claims, 1 Drawing Sheet

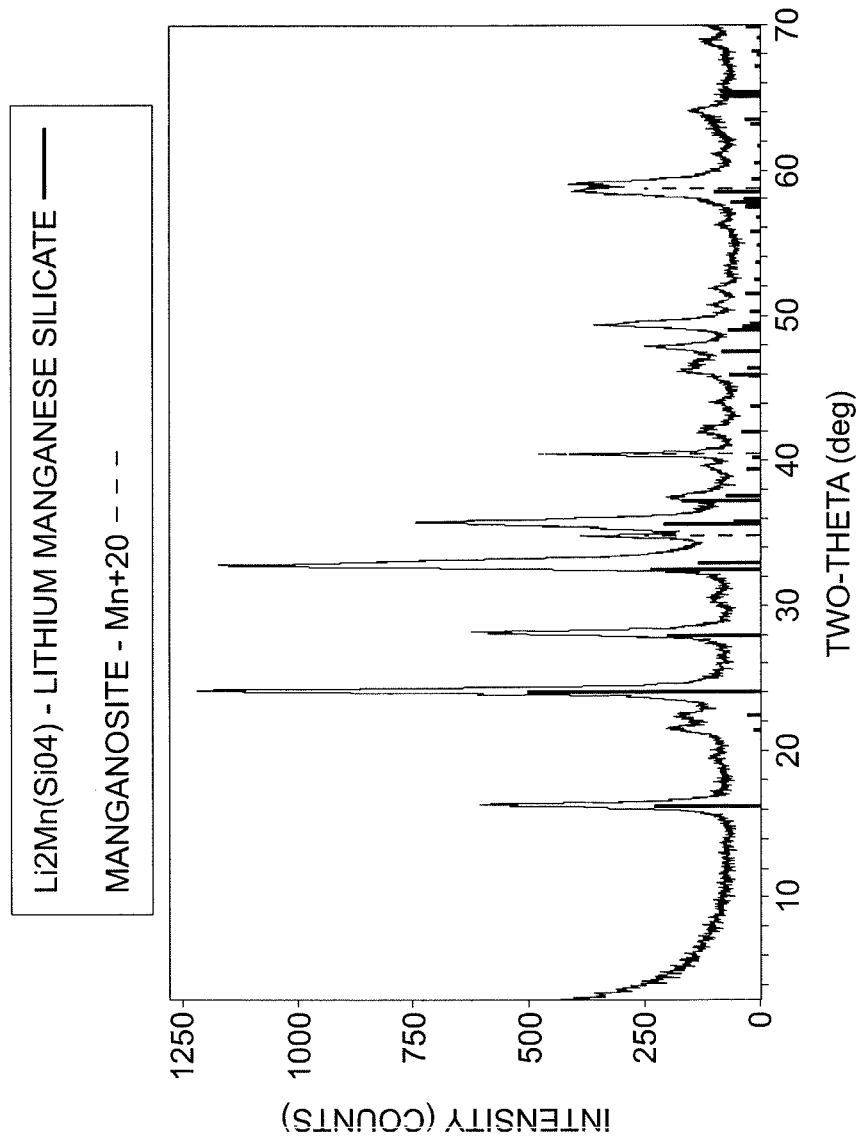

METHOD FOR PRODUCTION OF LI2MSIO4 ELECTRODE MATERIALS

CROSS-REFERENCE TO RELATED APPLICATION

This patent application claims priority to Provisional Application Ser. No. 61/685,488, IMPROVED METHOD FOR PRODUCTION OF Li2MSiO4 ELECTRODE MATERIALS, filed Mar. 19, 2012, the disclosure of which is incorporated herein by reference in its entirety.

FIELD OF THE INVENTION

The invention relates to methods of synthesis of lithium metal-silicate materials, to the use thereof as battery electrodes, and to battery cells that incorporate such electrodes.

BACKGROUND OF THE INVENTION

Given the importance of battery technology in enabling of the profusion of portable/mobile electronic and cordless electric devices, battery materials with improved performance and lower cost are of continuing interest. Electric and hybrid vehicles are another major application for high performance battery technology. Commercially, the most important battery class under development today, one having the highest energy density and excellent cycling performance, is the lithium ion battery. Although performance improvement is an ongoing goal, the biggest challenge for lithium ion batteries is achieving low cost.

Research and development is active around the world in all aspects of lithium ion battery composition, design, and manufacturing. Of particularly high importance are efforts aimed at the development of new lower cost, high performance anode and cathode electrode materials, and low cost material preparation methods. The safety of lithium batteries is also a general concern.

A known class of cathode materials receiving attention is that of the lithium metal-silicates having the general formula $Li_2MSiO_4$, wherein M can be Fe, Mn, or Co. These materials crystallize as layered intercalation compounds in which Li ions can freely drift in and out of the structure. Of particular interest is the possibility that up to 2 Li ions per formula unit may be extracted from, and returned to, the structure in a given charge/discharge cycle, thereby leading to very high charge storage capacities. While this remains an attractive goal for continuing development of these materials and lithium ion battery cells that incorporate them, this theoretical advantage has not yet been realized in a practical cell.

Once more, cost is a major concern for commercial applications, and from the point of view of raw element cost, and potentially high storage density, the $Li_2MSiO_4$ materials offer the opportunity for an improved cost/performance ratio in lithium ion battery technology. Of course material processing cost must also be considered, as material synthesis/processing technology is an important contribution to the overall cost. In general, traditional solid state synthetic methods use substantial amounts of time and energy to achieve a level of comminution of the input materials required to form sufficiently small particles that eventually enable the solid state reaction of the input materials to progress during a calcining and/or a sintering step that gives rise to the desired reaction product phase. This high temperature reaction portion of the process, known as calcining, is energy intensive, requiring both high temperatures and long times a high temperature, because the process relies on diffusion in the solid state over relatively long distances, given the particle-sizes typically achieved by mechanical milling of input materials.

Materials in the $Li_2MSiO_4$ family have been produced by a number of routes including traditional solid state ceramic processes. Aravindan et al. in *J. Mater. Chem.*, 2011, 21, 2470, entitled "Influence of carbon towards improved lithium storage properties of $Li_2MnSiO_4$ cathodes" disclose a process that uses a stoichiometric solid state synthesis, wherein the starting materials LiOH hydrate, $MnCO_3$, and $SiO_2$ are combined in a stoichiometric manner. They report that the Use of tetraethylene glycol (TEG) in a solvothermal process results in the formation of tarry thermal decomposition by-products that are tedious to remove, and are difficult to control. A sintering temperature of 900° C. is reported, whereby the resulting $Li_2MSiO_4$ material is not phase-pure, and scanning electron microscopy (SEM) reveals grain sizes in the 1 to 10 micrometer range with substantial particle aggregation. The use of adipic acid as a gelling and capping agent to assist in the synthesis and to prevent aggregation during sintering is also Reported.

US 2011/0269022 A1 to Takahiro Kawakami and Masaki Yamakaji discloses the synthesis of $Li_2MnSiO_4$ and $Li_2FeSiO_4$ by a traditional solid state synthetic approach, the latter from lithium carbonate, iron oxalate and silicon dioxide. Also disclosed are positive electrode materials comprised of $Li_2MSiO_4$, wherein M can be Fe, Mn, or Co, alone or in combination. Sintering temperatures reported are in the range of 700-100° C.

In "Microwave-Solvothermal Synthesis of Nanostructured $Li_2MSiO_4$/C (M=Mn and Fe) Cathodes for Lithium-Ion Batteries" by T. Muraliganth et al., *Chem. Mater.* 2010, 22, 5754-5761, the solvothermal preparation of the title compounds is disclosed. Tetraethylene glycol (TEG) is reported as the solvent for the process. Lithium hydroxide, manganese acetate, and tetraethyl orthosilicate (TEOS), in stoichiometric ratios of the cations, are combined in TEG solvent and sealed in a closed reaction vessel. The mixture is heated under stirring by microwave excitation to a temperature of 300° C. and a pressure of 30 atmospheres. However, the requirement of high-pressure sealed-reactor processing is a significant detriment to low cost, high volume manufacturing of $Li_2MSiO_4$. The reaction product was washed repeatedly in acetone to remove unwanted reaction by-products, and the authors report a high air sensitivity of the reaction product. The authors report single phase target product after a process step of heating at 650° C. (in Argon) of the solvothermal reaction product, the single phase target product is characterized by an average grain size of about 20 nm. The small grain size results from the solution-based preparation and is beneficial because of improved ionic and electronic conduction. Because of the low intrinsic electronic conductivity of the $Li_2MSiO_4$ materials, it is common in the art to coat the $Li_2MSiO_4$ particles with carbon. The authors report poor rate performance and severe capacity fade during cycling of the $Li_2MSiO_4$/C composite.

What is needed is a process for forming cathode materials of the class $Li_2MSiO_4$ having a low cost preparation process that produces a lithium ion battery with superior charge storage density, good rate performance, and extended cyclability, while offering safety in end-use applications.

SUMMARY OF THE INVENTION

In one aspect, the invention is directed to a low-cost solvent-based atmospheric pressure process for the preparation of $Li_2MSiO_4$, wherein M is selected from Fe, Mn, Co, and Ni, and wherein the process makes use of process-stable, high-boiling alcohol solvents.

In a second aspect, the invention relates to a low-cost, process for the preparation of $Li_2MSiO_4$, wherein M is selected from Fe, Mn, Co, and Ni, and wherein an excess of Li is employed to enhance formation of a crystalline $Li_2MSiO_4$ phase.

In a third aspect, the invention relates to a low-cost process for the preparation of $Li_2MSiO_4$, wherein M is selected from Fe, Mn, Co, and Ni, and wherein the $Li_2MSiO_4$ material is characterized by a nanoparticulate size on the order of 20 nm.

In yet another aspect the invention relates to lithium battery electrodes and lithium battery cells that comprise $Li_2MSiO_4$ materials, wherein M is selected from Fe, Mn, Co, and Ni, prepared by the processes of the invention.

BRIEF DESCRIPTION OF THE DRAWINGS

FIG. 1 is an X-ray diffraction (XRD) spectrum of material produced in Example 2, along with the line spectra of $Li_2MSiO_4$ (solid lines) and Manganosite (MnO, dashed lines).

DETAILED DESCRIPTION OF THE INVENTION

In one embodiment, the invention is directed to low cost processes that yield materials in the $Li_2MSiO_4$ system having favorable properties for use as electrode materials in lithium ion battery cells. For the purposes of the invention, the metal M in the above formula comprises the elements Fe, Mn, Co, and Ni, alone or in any combination. In a particular embodiment, the metal M and the element Si are present in about equimolar amounts.

In general, some important considerations for achieving a low cost process include elimination of time-consuming mechanical comminution processes, freedom from tedious and waste-product-producing wash steps, the use of competitively lower temperatures and shorter times at processing temperature, the use of atmospheric pressure during most, if not all, of the processing steps, and the ability to recycle solvent materials used in the process.

Some target properties for the $Li_2MSiO_4$ materials formed by the inventive processes and used as lithium battery cathodes include crystalline structures enabling cation intercalation, fine-grain non-aggregated microstructure, and high discharge capacity, rate performance, and cyclability. The production of high quality $Li_2MSiO_4$ materials requires excellent control of the material manufacturing process.

As is well known in the art, electronic conductivity in native $Li_2MSiO_4$ is insufficient for use in lithium ion batteries, requiring the use of a conducting matrix, such as carbon, around the particles of $Li_2MSiO_4$. The use of carbon to enhance electronic conductivity is known to diminish charge rate performance for batteries incorporating such composite electrode material systems. It is also known that rate performance is enhanced in composite electrodes by a fine-grained microstructure having high surface area.

The inventors have discovered that certain high boiling point aliphatic alcohols can be used in an ambient pressure solvothermal process to produce $Li_2MSiO_4$ in the intercalation crystalline structure. In particular embodiments, such alcohols have boiling points (at atmospheric pressure) of 200° C. or above and are liquid at room temperature. In particular embodiments, the solvent is stable against thermal decomposition reactions such as, for example, decomposition by hydro-alkoxy-elimination that is known to occur in glycol ethers (like tetraethylene glycol), during the liquid phase (heating) portion of the synthetic process. In other embodiments, alcohols having high boiling points but which are solids at room temperature are also useful for the purposes of the invention. In various other embodiments, organic alcohols that are fatty saturated monoalcohols or polyols can be employed. In other embodiments, a fatty olefinic alcohol is used. In certain other embodiments, high boiling point aromatic alcohols that are non-toxic and low cost are used. Combinations of alcohols are also useful in some embodiments. When employing alcohols in combination, it may be useful in particular embodiments for one or more of the alcohols to have a boiling point below 200° C., and at least one of the other alcohols in the combination to have a boiling point of 200° C. or above. In specific embodiments, high boiling alcohols for the purposes of the invention include, but are not limited to, the following:

Benzyl alcohol,
2-Phenylethanol,
1-phenyl-2-propanol,
m-methylphenol,
Glycerol,
1,5-pentanediol,
1,3-Propanediol,
1-nonanol,
1-decanol,
1-undecanol,
1-dodecanol*,
1-hexadecanol (Cetyl alcohol)*,
cis-9-hexadecen-1-ol (palmitoleyl alcohol),
16-methylheptadecan-1-ol (isostearyl alcohol),
1-octadecanol(Stearyl alcohol)*,
cis-9-octadecen-1-ol (Oleyl alcohol),
1,4-Butanediol,
1,3-Butanediol, and,
1,6-hexanediol*.

* signifies that the alcohol is a solid at room temperature.

Oleyl alcohol, which is a liquid at room temperature, low cost, and very stable in the inventive solvothermal process, is useful in a particular embodiment of the invention. In other embodiments, the stability that the solvent exhibits in the process conditions imparts excellent control and reproducibility to the process.

In particular embodiments, the process begins with readily available low cost starting materials (referred to herein as sources) that are soluble in or will complex with the solvent to be employed in the solvothermal process. In various embodiments the lithium (Li) starting material includes LiOH, the monohydrate and dihydrates of LiOH, $Li_2$(oxalate), Li-methoxide, Li-isoproproxide, Li-butoxide, and combinations thereof.

In various embodiments the manganese (Mn) starting material includes Mn di-aceteate hydrate, Mn(2-ethylhexanoate)$_2$, Mn(acetylacetonate)$_2$, Mn naphthenate.

In various embodiments, the iron (Fe) starting material includes ferrous acetate, Fe(2-ethylhexanoate)$_2$, ferrous napthenate, ferrous acetylacetonate, ferrous oxalate hydrate, ferrous oxalate di-hydrate, ferrous lactate hydrate, ferrous isopropoxide, ferrocene, and combinations thereof.

In various embodiments, the cobalt (Co) starting material includes cobalt diacetate tetrahydrate, cobalt citrate hydrate, Co(2-ethylhexanoate)$_2$, cobalt napthenate, and Co(acetylacetonate)$_2$, and combinations thereof.

In various embodiments, the silicon (Si) containing starting materials include tetraethyl ortho-silicate, tetra-methyl ortho-silicate, silicon tetra-acetate, fumed silica, colloidal $SiO_2$, and combinations thereof.

In a particular embodiment, starting materials containing Li, M and Si are combined in stoichiometric proportion corresponding to the chemical formula $Li_2MSiO_4$. In other words, the molar ratios of (Li:M:Si) are (2:1:1). However, the inventor has discovered that use of an excess amount of lithium can promote the formation of crystalline, single phase $Li_2MSiO_4$. In various embodiments an excess of lithium up to about 40% more than the stoichiometric amount is employed. Therefore, in various embodiments, the molar ratio of Li to M and/or Si ranges from about 2.0 to about 2.8

In other embodiments, the total molar amount of metal(s) M and the molar amount of element Si may differ, as a result, for example, from weighing errors. In various embodiments, the molar amount of the element Si is greater than or less than the total molar amount of metal ions present.

The starting materials as described above are combined with an aliquot of a high boiling point alcohol solvent, and then heated. In a particular embodiment, the reaction mixture is heated in a reflux apparatus, which, optionally, also includes a distillate collection means. In various embodiments, the ratio of the mass of combined starting materials to high boiling alcohol solvent is in the range of about 5% to 25%. In a particular embodiment, the air in the reflux or heating apparatus is replaced with an inert gas such as nitrogen or argon. In a particular embodiment, the reaction mixture is heated at ambient (atmospheric) pressure. In various embodiments the reaction mixture is heated to a temperature in excess of 200° C., in excess of 250° C. or in excess of 300° C. In various embodiments, the reaction mixture is physically mixed or stirred (herein referred to as agitated) in a continuous or intermittent manner during the heating step. In general, after several hours, a solid reaction product forms as a precipitate in a still clear and colorless solvent supernatant. In some instances, if the amount of excess Li employed is greater than about 40%, an intractable gel will form.

The supernatant is then separated, in whole or in part, from the solid reaction product by any known means. In various embodiments, the supernatant is decanted, filtered, evaporated, distilled, sublimed, centrifuged, oxidized, calcined or separated by any other known means. In particular embodiments, a formal separation step may not be included if, for example, insufficient supernatant is present following the initial heating step. In particular embodiments, the supernatant may be separated from the solid reaction product during the initial heating step by distillation, or supernatant may be separated and removed during the subsequent calcination step of the solid reaction product. Again, a formal step separating the solid reaction product from the supernatant may not be necessary.

In particular embodiments, after the solid reaction product is separated from the supernatant, the solvent is collected and reused, making the process more environmentally friendly.

In particular embodiments, the solid reaction product is washed with an organic solvent, such as toluene or isopropyl alcohol.

In general, X-ray diffraction analysis of the solid reaction product has revealed the presence of a limited amount of the target phase. Further heating of the solid reaction product is often required to enhance the yield of the target phase. In particular embodiments, the solid reaction product is subsequently calcined at temperatures greater than about 600° C. to enhance the formation of substantially single phase, crystalline $Li_2MSiO_4$ as revealed by X-ray diffraction. In particular embodiments, calcination is performed in whole or in part under an inert gas atmosphere. The calcined solid reaction product is then cooled.

In various embodiments, crystalline $Li_2MSiO_4$ in the form of nanoparticles of dimension of about 100 nm or less, about 50 nm or less, about 30 nm or less, and about 20 nm or less, are formed.

To further illustrate the invention and its advantages, the following examples are given, it being understood that the specific examples are not limiting.

EXAMPLE 1

Comparative Solvothermal Synthesis of $Li_2MnSiO_4$ using Tetraethylene Glycol Solvent Into a 250 ml round-bottom flask was placed 100 ml of tetraethylene glycol solvent (Aldrich), 1.08 g LiOH, 5.515 g $Mn(acetate)_2 \cdot 4(H_2O)$, and 4.69 g $Si(OEt)_4$ (via syringe). The molar amounts of Li, Mn, and Si were in stoichiometric proportion (2:1:1) with the aim chemical formula $Li_2MnSiO_4$. The apparatus was equipped with a 250 cc heating mantle, a distillation head with condenser, and purged with a nitrogen gas atmosphere. Stirring was continuous using a magnetic bar. The solution was degassed with $N_2$ prior to heating. The solution became a yellow color after all addenda were added and a white precipitate formed as the temperature approached reflux conditions. As the reflux continued, distillation of ethanol and water were initially observed. A light yellow liquid distilled over from 170-236° C.

The temperature in the reaction vessel increased to 270-305° C. and the reflux continued for a total of 12 hours. The liquid distilling over became darker yellow as the temperature increased (at constant heat input). By the end of the reflux step, 75 ml of distillate (dark yellow) was collected after coming off of the reaction flask. On cooling the reaction flask to room temperature, a dark brown/black tarry lump remained in the flask. About 30 ml of degassed acetone was added to the tarry reaction product. The reaction product did not appreciably dissolve so the flask was put into a $N_2$ filled glove bag and the contents extracted with a spatula into centrifuge tubes. The tubes were spun at 9.5 K rpm for 5 minutes and then the acetone supernatant was decanted. Then a second wash of acetone was added to the product, and the sealed centrifuge tubes were sonicated for about 10 min and then spun again for 5 min @ 9.5 K rpm. The supernatant was again decanted and the tubes sealed, then placed in a vacuum desiccator. The two centrifuge tubes were put into a glove bag (under $N_2$) and transferred to two 4 dram vials. Weight of product at this point was 18 g. These vials were placed in a vacuum oven at 80° C. at a pressure of about 0.2 inches Hg overnight. Weight of product after vacuum oven treatment was 12 g. Then the vials were put back into a glove bag (under $N_2$) and 5.11 g of product with organic contamination was put into a quartz boat and heated to 350° C. for 2 hr in a tube furnace under $N_2$. The tube of the tube furnace became coated with drops of organic solvent residue. The product was then heated while still in the tube furnace to temperature (~700° C.) for 2 hours, with the times for temperature adjustment up to and down from the set temperature totaling 3 hours up and 1.5 hours down, to complete the elimination of organics. The tube furnace exhibited considerable brown/yellow liquid condensed to the cooler walls. Evidently, the step of heating at 350° C. under $N_2$ was insufficient to remove volatiles from the solvothermal reaction product. The product of the 700° C. treatment was analyzed by X-ray diffraction (XRD) and by inductively coupled plasma atomic emission spectrometry (ICP-AES). XRD showed that the high temperature process yielded mainly the orthorhombic $Li_2MnSiO_4$ with some MnO also observed. ICP-AES revealed the elemental composition shown in TABLE 1 below.

TABLE 1

| Element | Analysis for Comparative Prep of $Li_2MnSiO_4$ in %(wt/wt) | Theoretical calculation for $Li_2MnSiO_4$ in %(wt/wt) |
|---|---|---|
| Li | 2.8 | 8.6 |
| Mn | 10 | 34 |
| Si | 4.9 | 17 |

The results shown above indicate that the yield of $Li_2MnSiO_4$ was at most only about 30%.

EXAMPLE 2

Inventive Solvothermal Synthesis of $Li_2MnSiO_4$ using Oleyl Alcohol

Into a 250 ml round-bottom flask was placed 100 ml of oleyl alcohol. The container was then degassed and charged with $N_2$. Next 1.348 g LiOH (a 25% stoichiometric excess), 5.515 g of $Mn(acetate)_2.4(H_2O)$, and 4.69 g of $Si(OEt)_4$, were placed in the reaction flask. The above reaction mixture was stirred continuously using a magnetic bar. The temperature of the contents of the reaction flask was then raised gradually over 90 minutes reaching a final temperature of about 340° C. and held constant for a total of about 8 hours. After overnight cooling, the flask was warmed with stirring to 50-60° C. to disperse the precipitate. The suspension of the reaction product was transferred in a glove bag into two centrifuge tubes and then spun at 9.5 krpm for 10 min. The supernatant was decanted and then degassed-toluene added to the tubes to wash the solid and the material was centrifuged again as above. A second and third wash with acetone was performed and the supernatant was poured off. The damp solid was transferred to a vial, placed in a tube furnace and heated to 85° C. under high vacuum (PUMP) for 30 minutes, and then transferred to a sealed vacuum desiccator overnight. The sample was then placed in a quartz boat and transferred under $N_2$ blanket to a tube furnace and heated according to the following schedule: the temperature was increased linearly from near room temperature over a 3 hour period to reach 750° C., and then held at 750° C. for 2 hours. Cool down was also linear and over a period of 2 hours.

X-ray diffraction (XRD) of the calcined jet-black powder product revealed substantially pure $Li_2MnSiO_4$ in the orthorhombic phase, as is shown in FIG. 1. Analysis of XRD peak width by the Scherrer method indicated that crystallite size in the $Li_2MSiO_4$ product phase was about 20 nm. Results of elemental composition analysis by inductively coupled plasma atomic emission spectrometry (ICP-AES) are shown in Table 2.

TABLE 2

| Element | Analysis for Inventive Prep of $Li_2MnSiO_4$ in %(wt/wt) | Theoretical calculation for $Li_2MnSiO_4$ in %(wt/wt) |
|---|---|---|
| Li | 8.4 | 8.6 |
| Mn | 27 | 34 |
| Si | 13 | 17 |

These results support the XRD phase identification. We note a substantial increase in yield to greater than about 75% was obtained with the combined use of an excess Li and the solvent oleyl alcohol relative to the stoichiometric synthesis in TEG solvent described in Example 1. In addition the burden of removing tar from the solid reaction product formed with the use of TEG solvent was eliminated when oleyl alcohol was used as the solvent.

EXAMPLE 3

Inventive Solvothermal Synthesis of $Li_2MnSiO_4$ using Various Amounts of LiOH

The procedures described above in Example 2 were repeated, except that the amount of LiOH employed corresponded to a stoichiometric amount, 10% more than a stoichiometric amount, 25% more than a stoichiometric amount and 50% more than a stoichiometric amount. The relative amount of crystalline $Li_2MnSiO_4$ produced was determined by calculating the ratio of the most intense XRD peaks for the $Li_2MnSiO_4$ phase and the MnO major phase impurity, as given in Table 3 below. A greater XRD Peak Ratio indicates more of the desired $Li_2MnSiO_4$ phase is produced.

TABLE 3

| Example | Excess LiOH | XRD Peak Ratio |
|---|---|---|
| 3a | none | 0.59 |
| 3b | 10% | 1.19 |
| 3c | 25% | 2.3 |

The results shown above indicate that as the amount of LiOH was increased above the stoichiometric amount (Ex. 3a) to a 25% excess (Ex 3c), the amount of crystalline $Li_2MnSiO_4$ phase increased by about 4 times. An increase to a 50% excess of LiOH resulted in gelation of the sample.

EXAMPLE 4

Inventive Solvothermal Synthesis of $Li_2MnSiO_4$ using 1-Hexadecanol

The procedures described above in Example 2 were repeated, except that oleyl alcohol was replaced with 1-hexadecanol. Similar results were obtained, along with the added benefit that fewer impurities were detected by XRD using this high boiling alcohol solvent.

EXAMPLE 5

Formation of Battery Cathode and Cell using Inventive $Li_2MSiO_4$ Material

A sample of the calcined $Li_2MnSiO_4$ product prepared in Example 2 was coated with graphitic carbon by mixing with D-sucrose at about 12 weight % and then pulverizing using a mortar and pestle. This mixture was placed into an alumina boat, pyrolyzed at 650° C. and then cooled.

A mixture was formed comprising the carbon coated $Li_2MnSiO_4$ (80 weight %), C*NERGY™ Super C-65 conductive carbon (obtained from TIMCAL, Bodio, Switzerland) (10 weight %), and polyvinylidene fluoride binder polymer (10 weight %). The solid mixture was dispersed in N-methylpyrrolidinone solvent and coated onto Al foil current collector to form a battery cathode.

The $Li_2MnSiO_4$ coated cathode was then fabricated into a coin cell battery vs. a Li/Li(+) anode. The electrolyte used was 1.2 M $LiPF_6$ ethylenecarbonate:ethylmethylcarbonate.

The coin cells were tested using an Arbin BT-2000 battery cycler and cycled between 2V and 4.5V at a constant current rate of 10 mA/g. A discharge capacity of 100 mAh/g was observed with good cycling behavior.

While the invention has been described by reference to various specific embodiments, it should be understood that numerous changes may be made within the spirit and scope of the inventive concepts described. Accordingly, it is intended that the invention not be limited to the described embodiments, but will have the full scope defined by the claims.

What is claimed:

1. A battery electrode, comprising $Li_2MSiO_4$ material, wherein the $Li_2MSiO_4$ material is prepared by a method comprising:
   (a) forming a mixture comprising a high boiling alcohol, a source of Li ions, a source of metal ions (M), and a source of Si, wherein the molar ratio of Li to M and/or Si ranges from about 2.2 to about 2.8;
   (b) heating the mixture of step (a), thereby forming a solid reaction product and a supernatant;
   (c) separating the solid reaction product from the supernatant; and (d) calcining the solid reaction product obtained from step (c) to produce $Li_2MSiO_4$.

2. The battery electrode of claim 1, wherein the electrode functions as a cathode.

3. A battery cell prepared with the electrode of claim 1.

4. The battery cell of claim 3, wherein the electrode is a cathode.

5. The battery electrode of claim 1, wherein M is selected from the group consisting of Fe, Mn, Co and Ni.

6. The battery electrode of claim 1, wherein the $Li_2MSiO_4$ material is comprised of nanoparticles having dimensions of about 20 nm or less.

7. The battery electrode of claim 1, wherein an X-ray diffraction (XRD) spectrum of the $Li_2MSiO_4$ material has a ratio of a most intense XRD peak for a $Li_2MSiO_4$ phase to a most intense peak for a major phase impurity of at least 1.19.

* * * * *